United States Patent [19]

Kiekhafer et al.

[11] Patent Number: 5,237,768
[45] Date of Patent: Aug. 24, 1993

[54] CASTABLE CRAB RIG

[76] Inventors: Terry A. Kiekhafer, Rte. 4, Box 562, North Branch, Minn. 55056; Frank DeWitt, 440 23rd Ave., Longview, Wash. 98632

[21] Appl. No.: 967,943

[22] Filed: Oct. 28, 1992

Related U.S. Application Data

[63] Continuation of Ser. No. 730,991, Jul. 16, 1991, abandoned.

[51] Int. Cl.$^5$ .............................................. A01K 69/00
[52] U.S. Cl. .......................................... 43/4.5; 43/11; 43/7
[58] Field of Search .................... 43/4.5, 12, 11, 14, 43/7, 100, 101, 103, 104

[56] References Cited

U.S. PATENT DOCUMENTS

| | | | |
|---|---|---|---|
| 482,635 | 9/1892 | Hanich | 43/12 |
| 563,486 | 7/1896 | Hibbert | 43/7 |
| 1,420,396 | 6/1922 | Warren | 43/12 |
| 1,927,599 | 9/1933 | Smith | 43/103 |
| 2,767,501 | 10/1956 | Bjorksten | 43/7 |
| 3,029,546 | 4/1962 | Ruiz | 43/12 |
| 3,484,981 | 12/1969 | Gilmer | 43/12 |

FOREIGN PATENT DOCUMENTS 0702913  2/1965  Canada ..................... 43/12

Primary Examiner—Richard K. Seidel
Assistant Examiner—James Miner
Attorney, Agent, or Firm—Fredrikson & Byron

[57] ABSTRACT

The invention concerns a castable rig and a method for catching crustaceans using a standard rod and reel. The disclosed rig includes an annular ring attached to a harness by means of a plurality of elongate suspension members. The periphery of a generally conical net is attached to the annular ring. A weight is attached to the net and a bait sack is positioned within the conical structure of the net. The bait sack may be integrally formed with the net.

6 Claims, 4 Drawing Sheets

CASTABLE CRAB RIG

This application is a continuation of U.S. Ser. No. 07/730,991, filed Jul. 16, 1991, now abandoned.

FIELD OF THE INVENTION

The present invention generally relates both to devices for catching crabs and other crustaceans and to sport fishing techniques and apparatus. In particular, the present invention provides a device and method for catching crabs and other crustaceans using a modified sport fishing rig.

BACKGROUND OF THE INVENTION

A wide variety of devices and methods are known in the art for catching crustaceans and the like. Most such devices, however, are intended for commercial applications and are therefore designed for expediency. They are generally designed to maximize the ability to catch such creatures while minimizing the amount of time necessary for an operator to be engaged with the device. Most such solutions have ranged from either passive devices, such as the conventional trap or "pot" used to catch lobsters and crabs, to dredging nets and the like.

However, there are very few devices which can be used by an individual or individuals in a sports fishing-type setting. In using most prior art devices, the operator simply places the device in a body of water and periodically checks to see if any of the desired crustaceans have been trapped. However, there is very little "sport" in using these devices, i.e., the operator has only limited participation in the process of catching the crustaceans.

Some inventors have attempted to provide devices for catching crabs and other crustaceans which can be used in a manner which more closely resembles sports fishing. Such devices desirably are capable of being cast with a rod and reel of the type conventionally used in sports fishing. U.S. Pat. No. 4,956,935 (Riddell) shows a relatively complex crab-catching apparatus which may be cast "with a sturdy rod and reel." This device generally comprises a plurality of rigid rods, with each rod attached at one end to a hub via a flexible spring. A net is stretched between the other end of each of these rods and rests flat upon the bottom of the body of water into which the device is cast.

Although the specification of this patent states that the device may be cast with a rod and reel, the device is quite bulky and very little consideration appears to have been given to the weight distribution of the device. Accordingly, casting such an apparatus in standard fashion with a rod and reel is, at best, awkward and is quite difficult to carry out with reasonable success. Furthermore, this apparatus does not permit the operator to become actively engaged in the process of catching the crabs which may crawl into the net. Instead, bait is simply placed on a spike above the net and the operator simply lifts the net periodically to see if any crabs have been ensnared when the device is lifted. Apart from visual observation of the device within the water, there does not appear to be any means of detecting when a crab is in the net. Hence, one cannot cast the device any significant distance with a rod and reel and still be able to monitor the deployed device.

Accordingly, it would be desirable to provide a rig for catching crabs and other crustaceans which allows the operator to actively participate in the process of catching the crustaceans. It is also desirable to provide such a device which may readily be casted with a standard, sports fishing-type rod and reel and permit the operator to detect the presence of a crab within the apparatus without requiring direct visual observation thereof.

SUMMARY OF THE INVENTION

The present invention provides a castable rig for catching crabs and other crustaceans using a standard rod and reel. The rig of the invention includes a generally circular annular ring which is attached to a harness by means of a plurality of elongate suspension members. One end of each suspension member is attached to the harness while the other end is attached to the annular ring. The periphery of a generally conical net is attached to the annular ring and the net is disposed away from the harness when the net is deployed. The apex of the conical net is desirably positioned such that the axis of the ring will substantially pass therethrough. A weight is attached to the net, preferably adjacent the apex thereof, by means of an elongate leader. The leader permits the weight to be spaced outwardly away from the annular ring, lending the device aerodynamic stability when it is cast.

The present invention also contemplates a method of catching crabs and other crustaceans. The harness of a device according to the invention may be attached to an end of a fishing line, which line may be operatively connected to an elongate, manually graspable pole, such as a common rod and reel mechanism. The rig of the invention may then be cast into a body of water using the pole in a standard fashion well known in sports fishing. Due to the presence of the weight on the device, the device will tend to settle down toward the bottom of the body of water. Tension may be placed on the fishing line to dispose a portion of the annular ring above the bottom of the body of water. As explained in more detail below, by monitoring the tension on the fishing line, the operator may detect the presence of a crab or other crustacean within the device and retrieve the rig in response to an increase in tension on the line.

DETAILED DESCRIPTION

Figure 2:
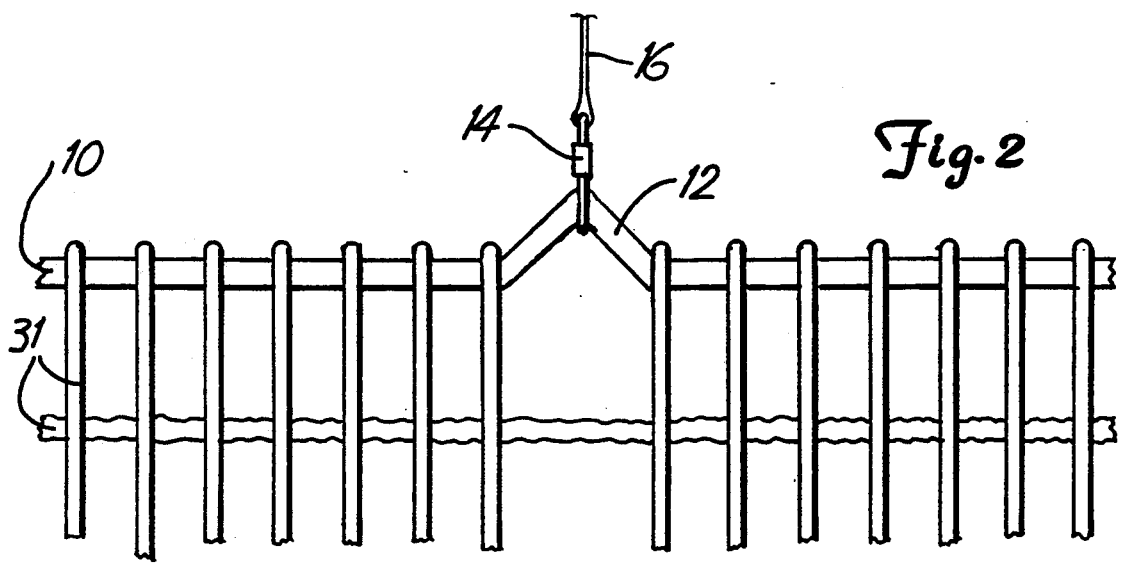
FIG. 2 shows a detail of the connection of a suspension member and the net to the annular ring of the device shown in FIG. 1.

A castable rig according to the present invention includes an annular ring 10 which may be of any suitable size and shape. For instance, the ring may comprise a generally flat steel band configured in a circular shape. In one preferred embodiment, though, the ring is generally toroidal in shape with a generally circular cross section. As best seen in FIG. 2, the net may be provided with a series of dimples for receiving a strand 31 of the net 30, as described in more detail below. The ring should be large enough to permit the desired species of crustacean to climb into the device and be captured. However, the ring should not be overly large or it will tend to hamper the ability of an operator to cast the device with a standard rod and reel mechanism. For instance, a ring having a diameter of about 14 inches has been found to work quite well.

Figure 3:
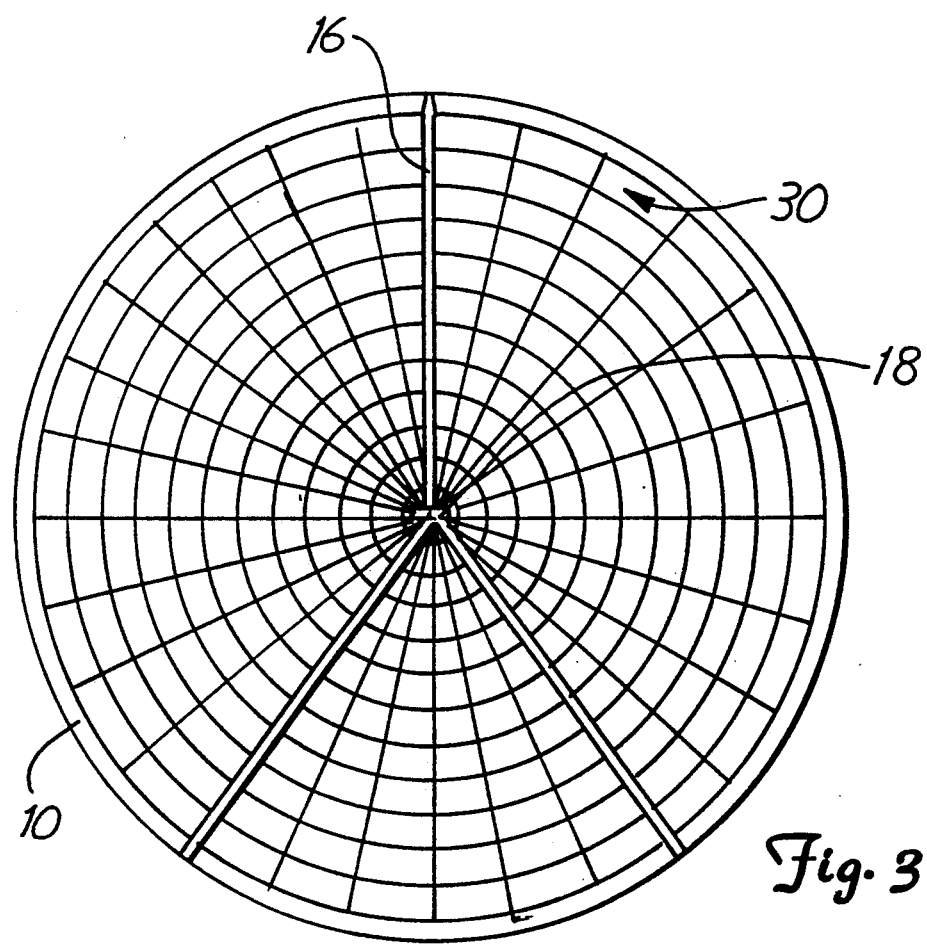
FIG. 3 is a top view of an alternative embodiment of the invention.

A plurality of elongate suspension members 16 are each attached at one end to the annular ring and at their other end to a harness 18. As best seen in FIG. 3, the suspension members 16 are attached to the annular ring 10 at locations which are desirably spaced equiangularly about the generally circular ring. In the embodiment shown, three suspension members are utilized, with each one being attached to the annular ring at a position spaced approximately 120° from the attachment of the other suspension members to the ring.

Figure 1:
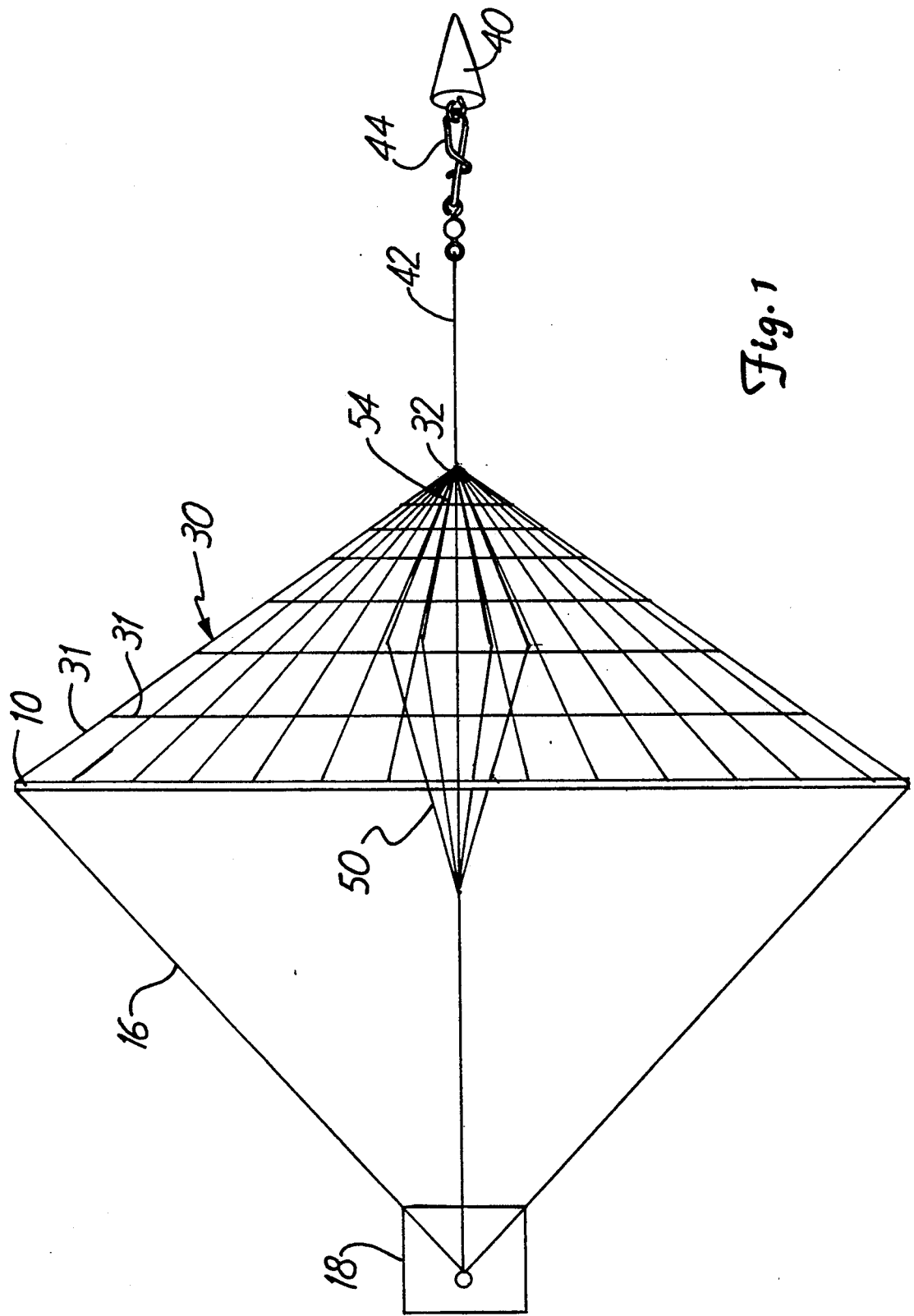
FIG. 1 is a side view of one embodiment of the present invention.
Figure 5:
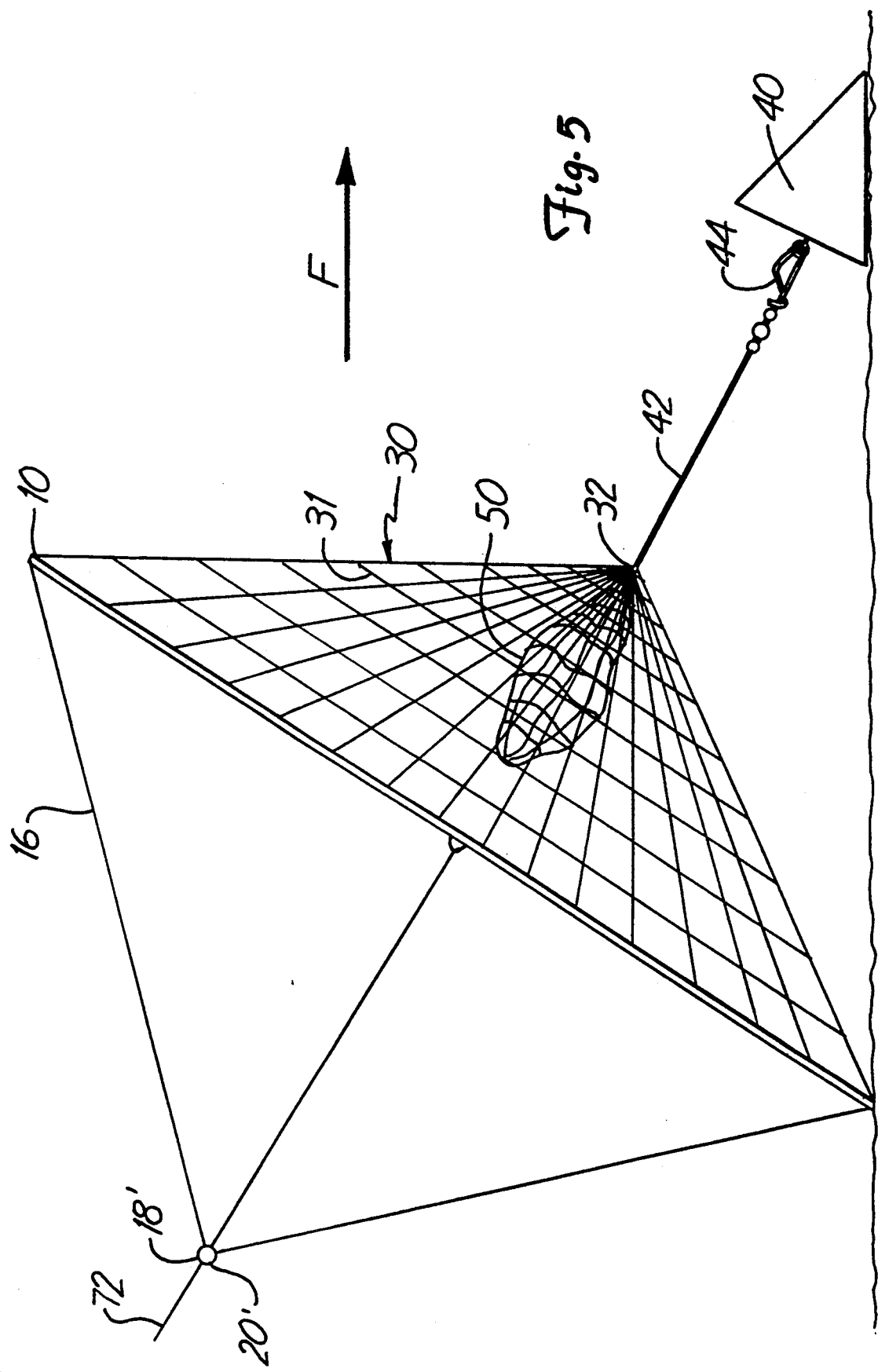
FIG. 5 shows the device of FIG. 3 deployed for use in a body of water.

As shown in FIGS. 1 and 5, the harness 18 is typified as a small ring. The suspension members may be attached to the harness by any suitable means. In the embodiment shown, the harness 18 includes a port 20 therethrough for receiving a portion of the suspension members. A segment of each suspension member 16 may be passed through this port and the suspension member ma be tied snugly about the harness to secure the suspension member thereto. Alternatively, the suspension members may all be crimped together at a position adjacent the harness 18 and be collectively attached to the harness.

The suspension members 16 and the harness 18 may be formed of any suitable materials. The suspension members may be relatively stiff, but it is preferred that they be formed of a relatively flexible material such as standard nylon fishing line. The use of a flexible line permits the device to be collapsed into a small, compact configuration for storage and shipping. The harness is desirably formed of a hard, durable material, such as a metal. If a metal is used, it is generally preferred that a corrosion resistant metal, such as galvanized steel or the like, be used in order to minimize oxidation due to repeated exposure to corrosive environments, such as salt water.

A device according to the present invention also includes a net 30 for capturing crabs. When deployed, the net is desirably generally conical in shape, with the periphery of the conical net being attached to the annular ring 10. Although the net may be attached to the ring by any suitable method, a preferred embodiment is shown in detail in FIG. 2. A plurality of individual, spaced-apart strands 31 define the structure of the net, and a length of each of these individual strands adjacent the periphery of the conical net is separately attached to the annular ring.

The annular ring 10 may include a plurality of dimples 12 or the like for attaching the suspension members 16 to the ring. As shown in FIG. 1, these dimples may simply comprise portions of the ring which are mechanically deformed to project out of the plane defined by the rest of the ring. The suspension members may be attached directly to the dimples, such as by snugly tying the suspension members thereto. In a preferred embodiment, however, a standard snap swivel 14 of conventional construction is employed. The snap swivel desirably fits snugly about a dimple of the ring to hold the suspension member in place on the dimple.

As noted above, the suspension members are desirably attached to the ring at equally spaced intervals. Hence, the dimples 12 may be positioned at locations spaced equiangularly about the generally circular ring. This not only serves to properly position the suspension members with respect to the ring, but also reduces the tendency of the net 30 to bunch up at one side of the ring. The dimples and the suspension members attached thereto will effectively block strands 31 of the net from sliding around the ring to collect at one side.

As noted above, the net 30 is desirably generally conical in shape. This conical shape defines an apex 32 which is desirably substantially centered with respect to the periphery of the net. When the apex is so centered, the axis of the annular ring will substantially pass through this apex. When deployed, the apex 32 is spaced rearwardly (to the right in FIG. 1) of the plane of the annular ring, thereby defining a generally conical cavity within the net bounded at its periphery by the ring 10.

A weight 40 is attached to the net by means of an elongate leader 42. This weight may be of the type commonly used in sports fishing, which weights are generally made of lead. The optimum mass of the weight 40 may vary depending upon the conditions of the body of water. Generally speaking, a heavier weight would be desired in rougher conditions while calmer water conditions would permit the use of a somewhat lighter weight. It has been found that a standard 10 oz. pyramid lead weight is suitable even for fairly rough water conditions, while a 5 oz. pyramid lead weight will usually suffice in calmer waters. Both of these pyramid lead weights are widely commercially available.

The weight 40 may be attached to the leader 42 by any desired means. In a preferred embodiment, though, a standard snap swivel 44 of the type used in sports fishing is employed. This swivel permits the weight to spin with respect to the leader when the rig is cast by an operator, avoiding any tangling of the leader. Such snap swivels also allow a user to relatively easily change the weight 40 to account for varying water conditions, as noted above.

One further advantage of using such a snap swivel is that if the weight 40 becomes snagged on the bottom of the body of water, the swivel can break and allow the rest of the rig to be saved. In a preferred embodiment, a snap swivel having a tensile breaking strength of approximately 60 pounds is used. The rest of the device is preferably designed to withstand significantly more than that load, such as approximately 160 pounds. Thus, the swivel is essentially a "weak link" in the design. Hence, if the weight becomes caught on something on the bottom of the body of water, the swivel will break before the rest of the device will fail, permitting the rest of the device to be retrieved intact.

Although the lead 42 may be formed of any useful material, such as string or standard fishing line, crabs are known to be able to cut through some materials with their claws. Thus, it is better to use a somewhat stronger material, such as a metal. Lighter gauge metal wires will tend to fail due to repeated flexing over time as the device is cast and retrieved during storage and redeployment of the device. Accordingly, a leader having a somewhat higher flexural strength, such as a stranded steel cable, has been found to provide a more durable product.

In the embodiment shown, the leader 42 is attached to the net 30 at a position generally adjacent its apex 32. As the apex is preferably positioned generally along the axis of the annular ring 32, this will tend to dispose the weight 40 toward a position along this same axis when the device is being cast. Having the apex and the weight generally centered along this axis provides a center of gravity for the structure which also lies generally along this axis. This provides for a more stable flight when the device is cast, greatly enhancing the ability of the operator to cast the rig a greater distance. The leader 42 may be attached to the net by any of a wide variety of attachment means. As explained in more detail below in connection with the bait sack 50, though, a clamping means 54 is used to both attach the leader to the net as well as to define the bait sack 50.

The bait sack 50 is desirably generally centered within the conical structure of the net. The purpose of the bait sack is to retain bait within the interior of the net to attract crabs and other crustaceans into the net. The bait may be positioned within the net in any known manner. However, the present invention provides a novel way of providing a bait sack integrally formed with the net 30. The bait sack shown in FIGS. 1 and 3-6 simply comprises a generally centrally located portion of the net which has been inverted inwardly in a manner not unlike the process of turning a common sock inside out. Once a suitably sized portion of the net has been so inverted, clamping means 54 may be placed about the neck of the bait sack, i.e., at the junction between the inverted portion of the net defining the bait sack and the rest of the generally conical net. Any structure which will serve to effectively close the bait sack to retain the bait therein may be used. For instance, a string or a strand of wire may be tied about the neck of the bait sack.

Figure 4:
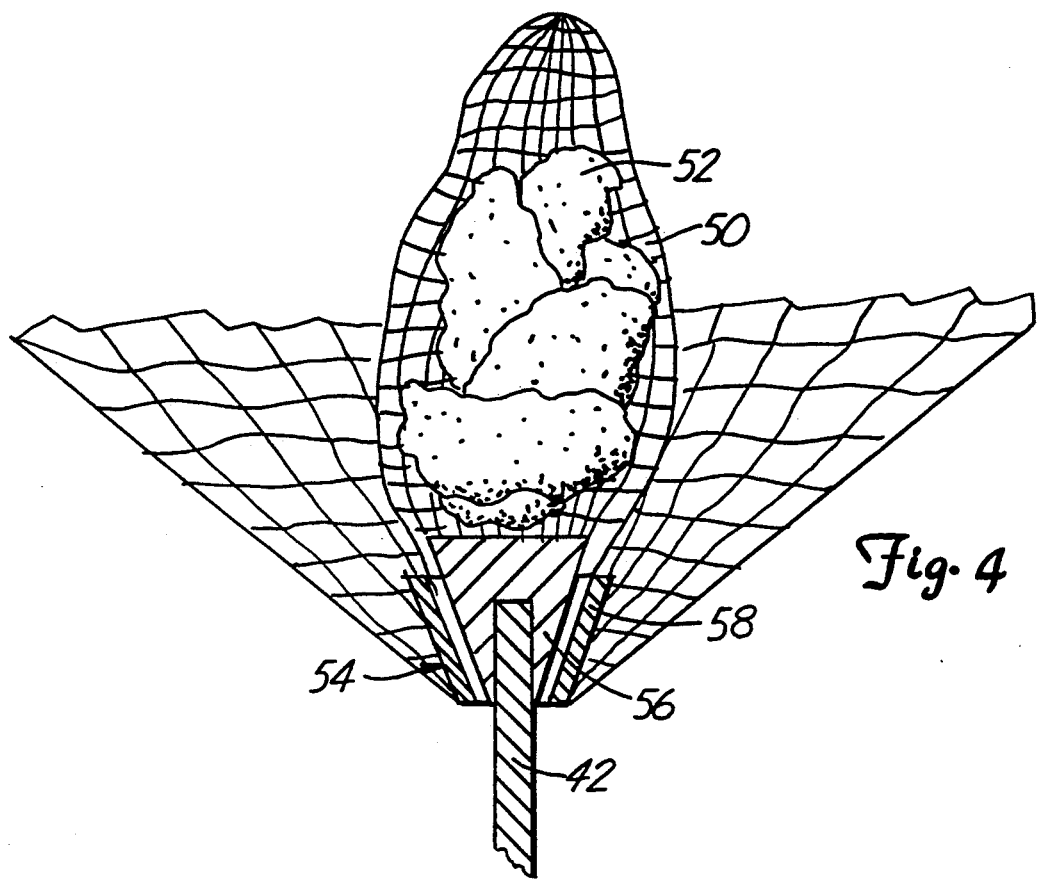
FIG. 4 is a detailed, cross-sectional view of the bait sack of the device shown in FIG. 1.

A particularly preferred embodiment of the clamping means 54 is shown in detail in FIG. 4. In this embodiment, the clamping means comprise a generally conical insert 56 which is attached to the end of the leader 42 opposite the end attached to the weight 40. Although the conical insert may be formed of the same material as the leader 42, the insert is desirably formed of lead or the like because such materials are somewhat softer than most metals, which will tend to reduce abrasion and wear on the netting material at the neck of the bait sack. The insert may be attached to the leader in any secure fashion, such as by welding.

The insert may be of any suitable shape, but is desirably generally wedge shaped, with a generally frusto-conical configuration such as that shown in FIG. 4 being preferred. Once the insert is placed within the neck of the bait sack, a collar means 58 may be fitted about the insert. The collar means is adapted to clampingly engage the neck of the bait sack between the collar and the insert to effectively close the bait sack. In the preferred embodiment shown, the collar means comprises a generally conically shaped ring which tapers outwardly at substantially the same rate as the conical insert so that it may provide a close fit against the insert.

The collar means 58 may be designed so that it may be removed from its clamping engagement of the neck of the bait sack. This would permit an operator to open the neck to easily place bait within the bait sack, and the operator may then place the collar means back on the bait sack. As explained in more detail below, though, the axial distance between the ring 10 and the apex 32 of the net is critical in casting the device. Accordingly, it is preferred that the collar means remain permanently attached so that the operator may not inadvertently vary this distance when refilling the bait sack.

In order to facilitate the placement of bait 52 in the bait sack, the distance between adjacent parallel strands 31 of the net should not be too small. A spacing of about 1" between the strands has proven to be large enough to permit bait, such as chicken wings or other common baits, to be passed into the bait sack between the spaced strands, yet small enough to prevent the bait from falling out during casting.

The relative dimensions of the elements of the present invention are critical in that significant variance from the preferred ratios can significantly hamper the ability to cast the net, if not essentially prevent casting all together. In particular, the ratio of the axial distance from the plane of the annular ring 10 to the apex 32 of the net with respect to the diameter of the ring 10 and the axial distance from the plane of the ring to the weight 40 with respect to the diameter of the ring significantly affect the ability to cast the device in a standard manner. It is preferred that the ratio of the axial distance between the ring 10 and the apex 32 is no more than about 0.75. This ratio can be made as small as desired; it is believed that a ratio of zero, i.e., a configuration wherein the net was substantially flat and the apex lied in the same as the ring, would provide a castable configuration. This does not provide very much room inside the net within which to trap crustaceans when retrieving the device. Accordingly, this ratio is desirably greater than zero and preferably no less than about 0.15, and in a preferred embodiment is no less than about 0.25.

Similarly, the ratio of the axial distance from the ring 10 to the weight 40 to the diameter of the ring should be no less than about 0.5. This ratio may be increased substantially beyond that minimum without having any substantial deleterious consequences upon the castability of the device. Nonetheless, this ratio should not be too high. If the ratio is too great, i.e., if the weight is spaced too far away from the ring, the device will become relatively unwieldy. In order to avoid having the weight resting upon the ground upon which the operator is standing when the casting stroke is begun, it is preferred that the axial distance from the harness 18 to the weight be no more than about 3 ft. It is to be understood, though, that even if this overall length were to be exceeded, the ability of the rig to fly well during casting should not be unduly hampered; it is simply more difficult for a person of average height to cast the device with a standard rod and reel if the overall length becomes too great.

Of critical importance, it was found through repeated testing that a device having a weight connected directly to the apex 32 of the net, i.e., a design with the leader 42 omitted, is simply unacceptable. When such a device is casted in a standard manner with a rod and reel, it has a strong tendency to begin to wobble in flight and begin turning over on itself. This in turn causes the entire device to become tangled, making the rig virtually impossible to cast in the conventional manner. Hence, it is vitally important that a leader 42 be disposed between the net and the weight. The leader, including the snap swivel 44, should be at least about 3.5 inches in length. If the leader is made appreciably shorter than this, the wobbling noted above will occur, reducing the castability of the rig.

By way of example, one preferred embodiment was found to work quite well. The apex 32 of the net was axially spaced from the ring by approximately 4½ inches while the ring itself had a diameter of about 14 inches, yielding a ratio of approximately 0.32 between these two dimensions. The weight was spaced an additional 5 inches from the apex of the net, i.e., the total length of the leader 42, including the length of the snap swivel 44, was 5 inches. This yields a ratio of the axial displacement of the weight from the ring to the diameter of the ring of about 9½:14, or about 0.68. Suspension members having a length of approximately 11 inches were found suitable in this configuration.

Figure 6:
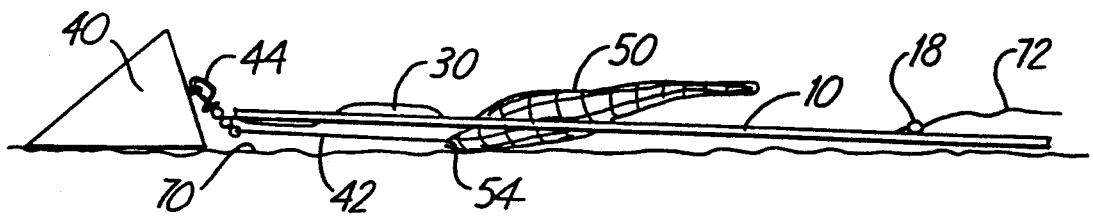
FIG. 6 shows the device of FIG. 5 when tension on a fishing line attached thereto is lost.

FIGS. 5 and 6 illustrate the operation of a device of the invention. In deploying the invention, a fishing line 72 or the like may be attached to the harness 18 in any manner known in the art. The fishing line is desirably operatively connected to an elongate, manually graspable pole, such as a standard rod and reel mechanism. The bait sack 50 may be filled with a suitable bait, as outlined above. Once the bait sack has been so filled and the fishing line has been attached to the device, the device may be cast in a conventional manner using a rod and reel. The relative dimensions of the device outlined above will ensure that the device will fly smoothly through an arc as it is cast without becoming tangled upon itself due to excessive wobbling or other movement.

The weight 40 will cause the apparatus to descend in the body of water until it reaches the bottom 70 thereof. Tension is then desirably placed upon the fishing line. The tension should be sufficient to dispose at least a portion of the annular ring 10 above the bottom 70. This lifts the bait sack, as well as the rest of the net, above the bottom 70, forcing crabs or other crustaceans to crawl within the conical net in order to reach the bait. By monitoring the tension of the fishing line in a known manner, the added weight of the crustacean on the net will be readily detectable by the operator, and the operator may retrieve the rig in response to detecting the concomitant increase in tension on the line.

In a particularly preferred embodiment, tension is maintained on the fishing line 72 in such a manner as to ensure that water flows across and through the net 30. (This flow of water is indicated schematically in FIG. 5 by the arrow labeled F.) This flow of water can be provided either by a natural current in the body of water or by constantly reeling in the fishing line. For instance, if one is using the apparatus in a river to catch fresh water crustaceans such as crayfish, the current of the river will act against the net. Similarly, in the ocean there is a cyclical, intermittent flow caused by wave action. The passage of water through the net causes drag on the net, which drag can be detected as tension upon the fishing line 72. When a crab or the like enters the net, the surface area of the body of the crab will significantly increase the drag on the net as water passes over the crab. This notable increase in drag can be readily detected by the operator as an increase in tension on the line 72. This will effectively inform the operator that a crab is within the net, and the operator may quickly begin retrieving the device, thereby catching the crab.

This interactive approach requiring monitoring by the operator much more closely resembles conventional sports fishing than does the standard, prior art method of catching crabs. As described above, in such prior art methods the operator passively waits and merely periodically checks the apparatus to see if a crab has been trapped thereby. Accordingly, the method of catching crabs and other crustaceans according to the present invention adds an element of sport to crabbing that is not present in any other crab catching device.

The dimension of the netting material may be chosen to further enhance the likelihood of catching a crab upon retrieval of the device. As can be clearly seen in FIG. 5, the individual strands 31 of the net 30 tend to converge in a rearward direction toward the apex 32 due to the clamping means 54. This convergence defines a series of generally trapezoidal spaces. As a crab crawls along the conical net to gain access to the bait sack 50, at least some of the crab's legs will tend to extend through some of these trapezoidal spaces. When the operator detects the presence of a crab and begins retrieving the device, the added tension on the netting will tend to pull on the net in a generally axial direction. This in turn causes the trapezoidal spaces between the strands of the net to contract somewhat. This contraction can pin the crab's leg and prevent the crab's escape during the retrieval of the device. A netting which has strands spaced approximately 1 inch from adjacent parallel strands has been found to work particularly well. When such netting is assembled in accordance with the present invention, the 1 inch squares of the net will tend to assume the trapezoidal configuration shown in FIG. 5 simply by virtue of the net being bunched up at the neck of the bait sack by the clamping means. The 1-inch spacing of strands defines trapezoidal spaces large enough for a crab's leg to pass therethrough, yet small enough for the spaces to constrict sufficiently during retrieval to grab onto the crab's legs and hamper the crab's escape.

FIG. 6 illustrates another advantage of the present invention. Conventional crustacean-catching devices, such as crab or lobster pots, simply sit passively on the bottom 70 of the body of water in which they are deployed. They commonly utilize fairly complex doors and other mechanisms which allow the crustacean to enter the trap in order to gain access to the bait stored therein, yet prevent the crustacean from exiting the trap. When such devices are lost, such as when the line by which they were intended to be retrieved is inadvertently broken, they will continue to trap crustaceans within the apparatus with only the bait originally placed inside the trap as a food supply. The crabs or lobsters will be unable to escape from the trap and will simply slowly starve to death if the device is not retrieved. Many regulatory agencies have passed regulations significantly restricting the materials which may be used in constructing such traps in order to ensure that they will fall apart over a relatively short period of time if they are inadvertently lost.

As illustrated in FIG. 6, the risk of permanently trapping a crustacean is effectively eliminated by the present design. When tension on the fishing line 72 is lost, such as when the fishing line breaks, the ring 10 will no longer remain disposed above the ocean floor. Instead, it will tend to collapse and generally rest upon the bottom 70 of the body of water, as shown in FIG. 6. Crustaceans will continue to be attracted by the bait in the bait sack 50, but their ingress and egress from the device is not hampered. The crabs may simply crawl along the bottom 70 and across the netting 30 to gain access to the bait without becoming permanently ensnared in the netting. Even after gaining access to the bait, the crabs are free to leave the device by simply walking back across the netting.

While a preferred embodiment of the present invention has been described, it should be understood that various changes, adaptations and modifications may be made therein without departing from the spirit of the invention and the scope of the appended claims.

What is claimed is:

1. A castable crab rig comprising an annular ring; a harness and a plurality of elongate suspension members, each suspension member being attached at one end to the harness and at the other end to the annular ring; a generally conical net having a periphery and an apex, the periphery of the net being attached to the annular ring and the axis of the annular ring substantially passing through the apex; a bait sack positioned within the conical net and attached to the net adjacent to the apex thereof, the bait sack being adapted to receive bait to attract crustaceans into the net; and a weight and elongate leader means for attaching the weight to the net, the leader means being attached at one end to the net adjacent to the apex thereof and at the other end to the weight.

2. A castable crab rig comprising an annular ring; a harness and a plurality of elongate suspension members, each suspension member being attached at one end to the harness and at the other end to the annular ring; a generally conical net having a periphery and an apex, the periphery of the net being attached to the annular ring and the axis of the annular ring substantially passing through the apex; a bait sack attached to the net adjacent the apex thereof, the bait sack being formed integrally with the net by inverting a portion of the net inwardly; clamp means for closing the bait sack, the clamp means comprising a generally conical insert receivable within the bait sack and collar means for clamping the net against the insert; and a weight and an elongate leader means for attaching the weight to the net, the leader means being attached at one end to the net adjacent the apex thereof and at the other end to the weight.

3. A method of catching crustaceans comprising
  (a) providing a crab rig having an annular ring, a harness and a plurality of elongate suspension members for attaching the harness to the ring, a generally conical net having a periphery attached to the annular ring and an apex, a bait sack attached to the net, a weight, and an elongate leader means for attaching the weight to the net;
  (b) attaching a fishing line to the harness, the fishing line being operatively connected to an elongate, manually graspable pole means;
  (c) casting the rig into a body of water with said pole means; and
  (d) placing tension on the fishing line means to dispose a portion of the annular ring above the bottom of the body of water.

4. The method of claim 3 further comprising the step of monitoring tension on the fishing line to determine the presence of a crab on the net.

5. The method of claim 4 further comprising the step of retrieving the rig in response to detecting an increase in tension on the fishing line.

6. A castable crab rig comprising an annular ring; a harness and a plurality of elongate suspension members, each suspension member being attached at one end to the harness and at the other end to the annular ring; a generally conical net having a periphery and an apex, the periphery of the net being attached to the annular ring and the axis of the annular ring substantially passing through the apex; a bait sack formed integrally with the net by inverting a portion of the net inwardly; clamp means for closing the bait sack; and a weight and an elongate leader means for attaching the weight to the net, the leader means being attached at one end to the net adjacent to the apex thereof and at the other end to the weight.

* * * * *